VOLUME EXPANSION IN RESPONSE TO LEVEL OF PILOT SIGNAL

Filed Sept. 29, 1960 2 Sheets-Sheet 1

INVENTOR
Frank de Jager
Petrus J. van Gerwen
BY
Frank R. Trifari
AGENT

INVENTOR
Frank de Jager
Petrus J. van Gerwen
BY
Frank R. Jinfari
AGENT

United States Patent Office 3,112,461

Patented Nov. 26, 1963

3,112,461

VOLUME EXPANSION IN RESPONSE TO LEVEL OF PILOT SIGNAL

Frank de Jager and Petrus Josephus van Gerwen, Eindhoven, Netherlands, assignors to North American Philips Company, Inc., New York, N.Y., a corporation of Delaware Filed Sept. 29, 1960, Ser. No. 59,286
Claims priority, application Netherlands Oct. 2, 1959
7 Claims. (Cl. 333—14)

The invention relates to devices for volume expansion of information signals, in particular of speech signals, in which the incoming information signals are accompanied by a pilot signal situated beside the information signal band, which pilot signal varies in its amplitude substantially inversely proportional to the level of the original information signal, and in which for volume expansion in accordance with the pilot signal the information signal and the pilot signal together are supplied to a volume expansion device.

The above volume expansion device can advantageously be used in combination with the volume compression device according to copending application Serial No. 59,445, filed September 29, 1960, in which, together with a volume compression of the information signals, a pilot signal is produced which, in its amplitude, varies substantially inversely proportional to the level of the original information signal. This object is realized in a simple manner by supplying the information signal, together with a constant pilot signal, to a compression voltage rectifier and a succeeding push-pull modulator and to an amplitude limiter which is also controlled by the output voltage of the push-pull modulator, while the volume compressed information signals and also the associated pilot signal are derived, via a selection filter, from the output circuit of the amplitude limiter.

The object of the present invention is to provide a particularly advantageous device for volume expansion of the type as described above, in which, together with an accurate volume expansion, signal distortions are reduced to a high extent.

The volume expansion device according to the invention is provided with a pilot signal and with a frequency shift stage which, by frequency shifting, enlarges the frequency distance between information signal band and pilot signal, which volume expansion device is further provided with a limiter which is fed by the information signal and the pilot signal which are mutually shifted in frequency, while the volume-expanded information signals are derived from a selection filter in the output circuit of the amplitude limiter.

Figures 1, 2:
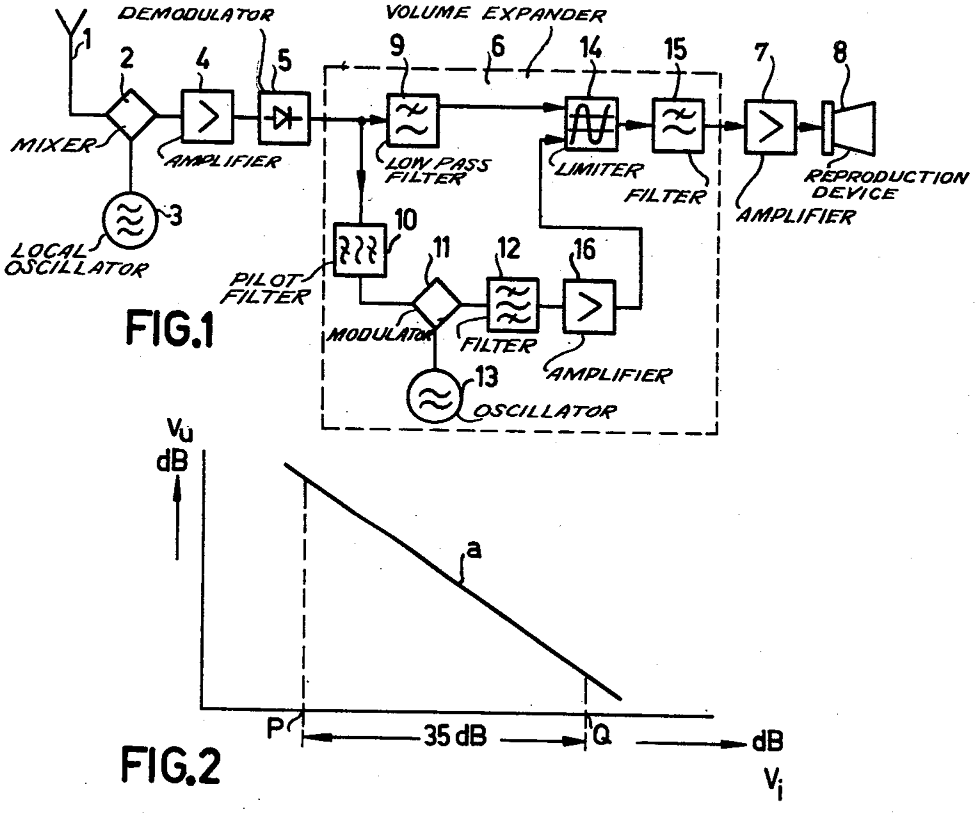
Figure 4:
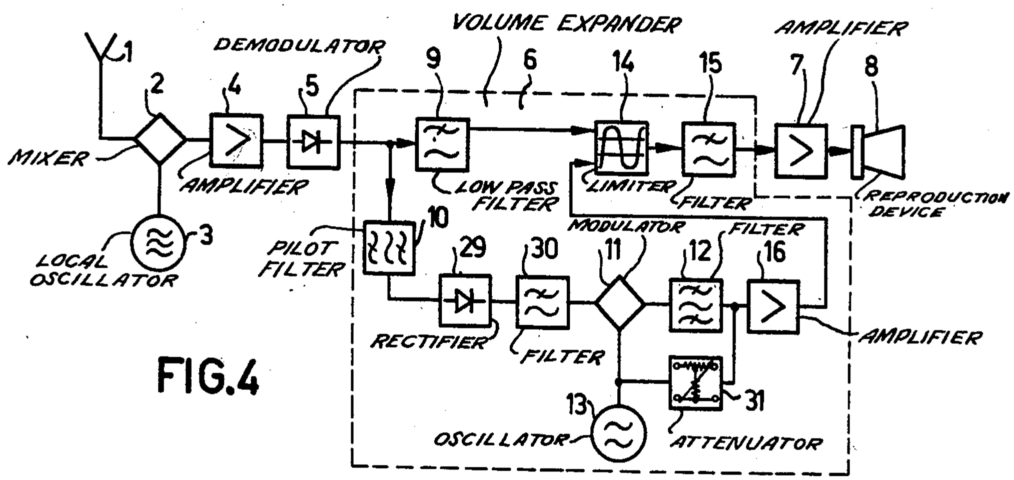
Figure 3:
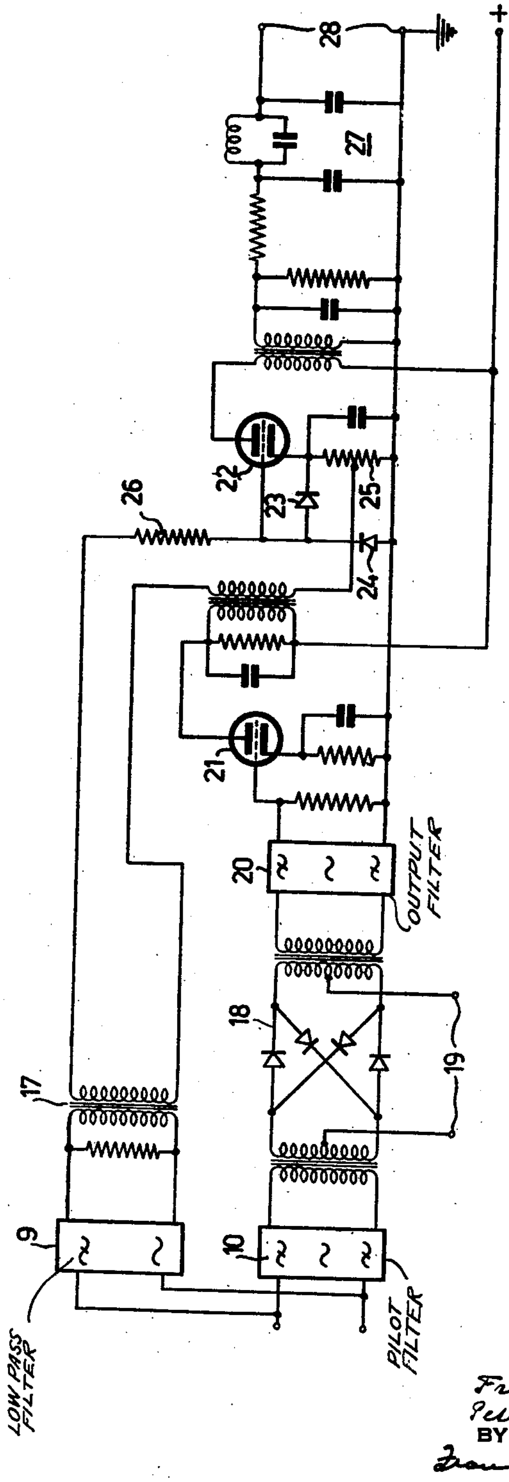

In order that the invention may be readily carried into effect, it will now be described in greater detail by way of example with reference to the accompanying drawings, in which FIGURE 1 shows a block schematic view of a receiver provided with a volume expansion device constructed in accordance with the invention, FIGURE 2 shows the volume expansion characteristic of the expansion device used, FIGURE 3 is a detailed circuit arrangement of the volume expansion device shown in FIGURE 1, and FIGURE 4 is a variant of the volume expansion devices shown in FIGURES 1 and 3.

The receiver shown in FIGURE 1 is designed for receiving speech signals modulated in amplitude on a carrier wave frequency situated in the band of 0.3–3.4 kc./s. and a pilot signal of for example 3.7 kc./s. situated beside the signal band, the amplitude of which varies inversely proportional to the amplitude of the original speech signal. The amplitude variations of the pilot signal show a highest frequency of for example approximately 100 c/s.

In the receiver shown in FIGURE 1, the incoming high frequency signals are received by a receiving aerial 1 and supplied to a mixer stage 2 with local oscillator 3 which is connected to a demodulator 5 via an intermediate frequency amplifier 4. The audio frequency speech signals in the band of 0.3–3.4 kc./s. and the pilot signal of 3.7 kc./s. which, in its amplitude, varies inversely proportional to the level of the original speech signal, are derived from the output circuit of the demodulator 5 and collectively supplied to a volume expansion device 6 to be described, said device being connected, via a low frequency amplifier 7, to a reproduction device 8.

For volume expansion, the volume expansion device 6 is provided with a low-pass filter 9, connected to the output circuit of the amplitude detector and having a limit frequency of 3.4 kc./s., and with a pilot filter 10 having a pass band of 3.6–3.8 kc./s. for the mutual separation of the speech signals of 0.3–3.4 kc./s., and the pilot signal of 3.7 kc./s., in which, for increasing the frequency distance with respect to the speech signals at the frequency conversion stage 11 in the form of a push-pull modulator with an output filter 12 and an associated local oscillator 13, the selected pilot signal is converted to the band of 23.7 kc./s. with a frequency of 20 kc./s. The speech signals selected by the speech filter 9 and the pilot signal in the band of 23.7 kc./s. converted in frequency are collectively supplied to an amplitude limiter 14, the volume-expanded speech signals being derived from the output circuit of the amplitude limiter 14 and supplied to the low-frequency amplifier 7 via a selection filter 15 in the form of a low-pass filter having a limit frequency of for example 3.4 kc./s.

If provision has been made for the pilot signal of 23.7 kc./s. to occur at the input of the limiter 14 with an amplitude larger than the speech signal, for example by including an amplification stage 16 in the output circuit of the frequency conversion stage 11, a series of successive pulses in the frequency of the pilot signal of 23.7 kc./s., the duration of which varies in accordance with the instantaneous value of the speech signal, appear at the output of the limiter 14 by limiting the output voltage of the frequency conversion stage 11. The value of the overall variation of the duration of the produced pulses is given by the ratio between the amplitude of the speech signal and the amplitude of the pilot signal and is consequently inversely proportional to the amplitude of the pilot signal; if for example the amplitude of the pilot signal increases by a given factor, the value of this overall variation of the duration will decrease by the reciprocal of this factor, whereas with a decrease of the amplitude of the pilot signal by a given factor, the value of the overall variation of the duration will increase by the reciprocal of this factor. According as the amplitude of the pilot signal is decreased or increased, the overall variation of the duration of the duration-modulated pulses produced and consequently also the amplitude of the speech signal obtained in the selection filter 15 by demodulation of the duration-modulated pulses will be increased or decreased in a ratio which is inversely proportional to the variation factor of the pilot signal, so that an expansion of the speech signal is effected in accordance with the amplitude of the original speech signal, the amplitude of the pilot signal varying inversely proportional to the amplitude of the original signal.

In the above device for volume expansion which is effected via the linear processes of a pulse duration modulation and a successive pulse duration demodulation, signal distortions are reduced to a high extent. The freedom from distortion in particular may be increased in a simple manner to a maximum value by seeing to it that the frequency of the pilot signal at the input of the limiter 14 is at least 3 times higher than the highest signal frequency, while its amplitude is made a few times larger, for example 4 times larger, than the largest amplitude of the speech signals. In addition, the volume expansion device described has the advantage of being little sensitive to simultaneous level variations of speech signal and pilot signal, for example as a result of fading phenomena or damping variation of the transmission lead in the case of line transmission. In the case of such simultaneous level variations, the duration of the pulses produced and consequently also the signals reproduced is not affected substantially.

FIGURE 2 shows the control characteristic of the volume expansion device 6, the amplitude variation of the speech signals $V_u$ being plotted in db in accordance with the level $V_i$ of the pilot signal supplied to the input of the limiter 14. As already explained above, the amplitude variation of the speech signal will vary inversely proportional to the amplitude of the pilot signal $V_i$ and consequently be indicated by the straight line *a* in the logarithmic characteristic as shown; in a realized embodiment, the value of the expansion control range PQ amounted to approximately 35 db.

In spite of the value of the volume expansion control range, an excellent transmission quality and an accurate expansion control are realized in the volume expansion control device 6 described, the construction of this device being simple and the proportioning little critical. Together with the advantages stated above, namely optimum speech quality, extensive independence of fading phenomena, simple and little critical construction, the freedom from interference also is particularly favourable, the pilot signal having a maximum amplitude during the speech intervals, so that noise and interference signals during the speech intervals will experience a maximum attenuation. The signals have turned out to be very well intelligible in the device shown at a signal-to-noise ratio of 10–15 db.

FIGURE 3 is a detailed embodiment of the volume expansion device shown in block schematic view in FIGURE 1.

In this device, the signals detected in the amplitude detector 5 and comprising the speech signal lying in the band of 0.3–3.4 kc./s. and the pilot signal of 3.7 kc./s., are supplied in parallel combination to a speech filter 9 in the form of a low-pass filter having a limit frequency of 3.4 kc./s. and a pilot filter 10 having a pass band of 3.6–3.8 kc./s.

For volume expansion, the speech signal is supplied, via a transformer 17, to an amplitude limiter to be described, while the pilot signal is supplied for frequency shift to a ring modulator 18, an oscillator having a frequency of 20 kc./s. being connected to the terminals 19 of the ring modulator 18. The frequency-converted pilot signal in the band of 23.6–23.8 kc./s. is selected in an output filter 20 having a pass band of 23.6–23.8 kc./s. and, after amplification in an amplifier 21, supplied, together with the speech signal, to an amplitude limiter which is connected in the control grid circuit of an amplifier tube 22. The amplitude limiter comprises two rectifiers 23, 24 unlike electrodes being connected together and to the control grid of the amplifier tube 22, while the limiting level of the two rectifier cells is derived from a cathode resistor 25 connected in the cathode circuit of the tube. For this purpose, the rectifier cell 23 is connected to the end of the cathode resistor 25 facing the cathode of the tube 22, while the junction point of the rectifier cells 23, 24 is connected, via a resistor 26 and the secondary of the transformer, to a tapping of the cathode resistor 25.

The limited signals are amplified in the amplifier 22 and supplied, via a low-pass filter 27 having a frequency of 3.4 kc./s., to the output terminal 28, in which in the manner as already described with reference to FIGURE 1, volume expansion of the speech signals derived from the output terminal is realized.

FIGURE 4 in block schematic view shows a variant of the device for volume expansion as shown in FIGURES 1 and 3. Elements corresponding to those of FIGURE 1 have been indicated with the same reference numerals.

To improve the transmission quality in the device shown the pilot signal selected in the pilot filter 10 for the frequency convention in the frequency conversion stage 11 constructed as a push-pull modulator, is rectified in a rectifier stage 29 and a succeeding low-pass filter 30 having a limit frequency of for example 100 c./s. Naturally, the push-pull modulator 11 should be constructed for modulation of direct voltages.

It is achieved, in the device shown, by the rectification of the pilot signal in the rectifier stage 29, 30 that phase variations in the pilot signal, for example by interference voltages, decay phenomena and the like, which otherwise would result in a corresponding interference component in the signal reproduced by the reproduction device 8 via corresponding variations of the duration of the pulses produced in the limiter 14, are no longer transmitted to the limiter 14.

At the same time, it is rendered possible in a simple manner in the device described to adjust the upper limit of the expansion control range at a desired value by providing a variable attenuater 31 between the output of the local oscillator 13 and the output of the frequency conversion stage 11, 12. Since the output voltage of the frequency conversion stage 11, 12 can only fall to the voltage supplied via the attenuator 31, the volume expansion can increase only to the value given by this voltage and can consequently not be increased arbitrarily to a high value under conditions, for example strong noise, this measure can advantageously be used.

The limiting of the expansion range may also be effected in a different manner, for example by providing a suitable carrier wave leakage in the push-pull modulator 11 or by supplying a constant direct voltage as modulation voltage to the push-pull modulator 11.

It is noted that in addition to the volume expansion devices described in the preceding figures, this volume expansion device according to the invention may also be constructed in other manners. It is also possible, for example, to select the pilot signal in the intermediate frequency band and to supply it to the limiter together with the detected speech signal. The operation of this device is entirely equal to the operation of the device shown in FIGURES 1 and 3. However, in this case the frequency shift between pilot signal and information signal is not effected by frequency conversion of the audio frequency pilot signal in the frequency conversion stage 11 but by directly using the pilot signal in the intermediate frequency band.

What is claimed is:

1. A volume expansion system for the reception of incoming signals including information signals and a pilot signal having adjacent frequencies, said pilot signal having an amplitude inversely proportional to the level of an original signal from which said information signal is derived, said system comprising means for separating said pilot signals and information signals, means for shifting the frequency of said pilot signal to increase the frequency distance between said pilot signals and information signals, amplitude limiter means, means for applying said information signals and said frequency shifted pilot signals to said limiter means, said frequency shifted pilot signals having an amplitude greater than said information signals as applied to said limiter means, and means for deriving an expanded output signal from said limiter means.

2. A volume expansion system for the reception of incoming signals including information signals and pilot signal having adjacent frequencies, said pilot signal having an amplitude inversely proportional to the level of an original signal from which said information signal is derived, said system comprising means for separating said pilot signals and information signals, a source of local oscillations with said pilot signals whereby modulated oscillations are produced at a greater frequency distance from said information signals than said pilot signals, amplitude limiter means, means for applying said information signals and said modulated oscillations to said limiter means whereby said modulated oscillations have an amplitude greater than said information signals as applied to said limiter means, and means for deriving an expanded output signal from said limiter means.

3. The system of claim 2, in which the frequency of said local oscillations is at least three times the highest frequency of said information signals.

4. The system of claim 2, comprising attenuator means for applying said local oscillations to said limiter means.

5. A volume expansion system for the reception of incoming signals including information signals and a pilot signal having adjacent frequencies, said pilot signal having an amplitude inversely proportional to the level of an original signal from which said information signal is derived, said system comprising means for separating said pilot signals and information signals, rectifier means, means applying said pilot oscillations to said rectifier means, a source of local oscillations, means for modulating said local oscillations with the output of said rectifier means whereby modulated oscillations are produced at a greater frequency distance from said information signals than said pilot signals, amplitude limiter means, means for applying said information signals and modulated oscillations to said limited means, said modulated oscillations having a greater amplitude than said information signals at the input of said limiter means, and filter means connected to the output of said limiter means for passing signals of the frequency band of said information signals and rejecting signals of the frequency of said local oscillations.

6. The system of claim 5, wherein said modulating means comprises means for modulating said local oscillations with a constant direct voltage and the output of said rectifier means.

7. The system of claim 5, comprising means for applying unmodulated said local oscillations to said limiter means.

References Cited in the file of this patent

UNITED STATES PATENTS 2,907,831 De Jager ---------------- Oct. 6, 1959